May 5, 1925.
C. W. YOUNG
FABRIC TREATING MACHINE
Filed Oct. 21, 1924  2 Sheets-Sheet 1
1,536,644
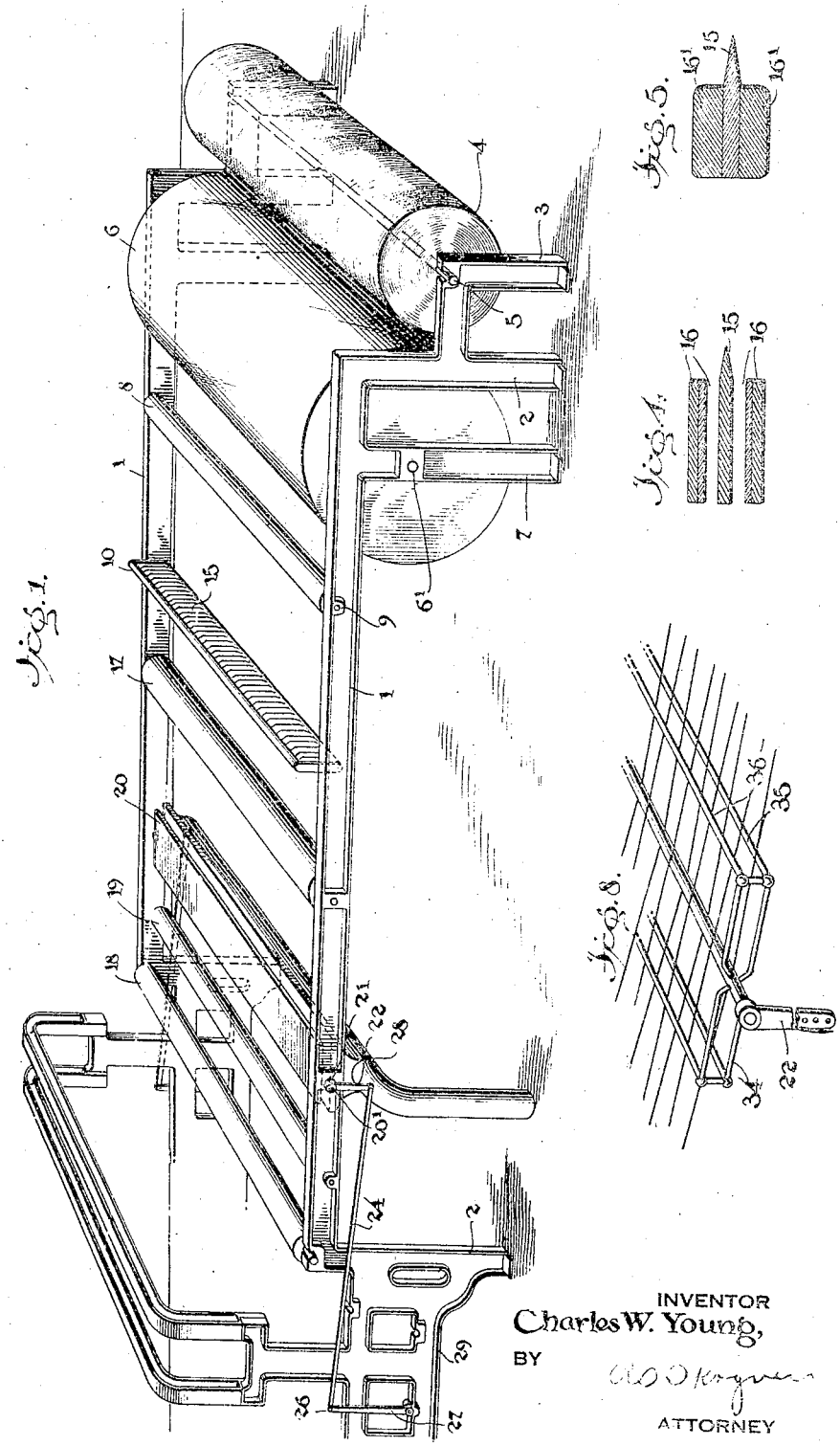
INVENTOR
Charles W. Young,
BY
ATTORNEY May 5, 1925.
C. W. YOUNG
1,536,644
FABRIC TREATING MACHINE
Filed Oct. 21, 1924        2 Sheets-Sheet 2
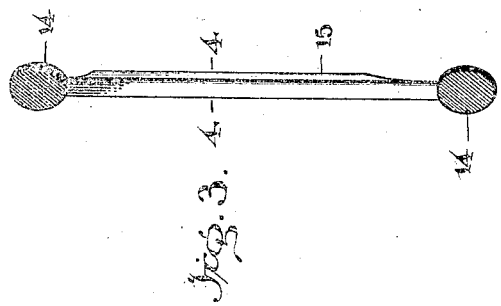
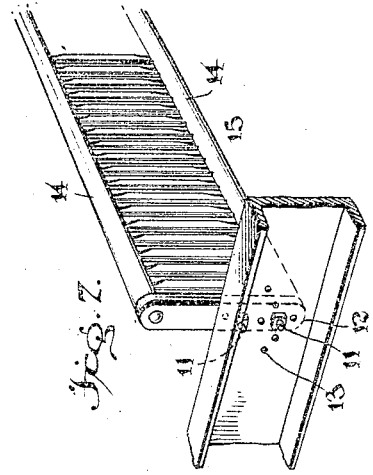
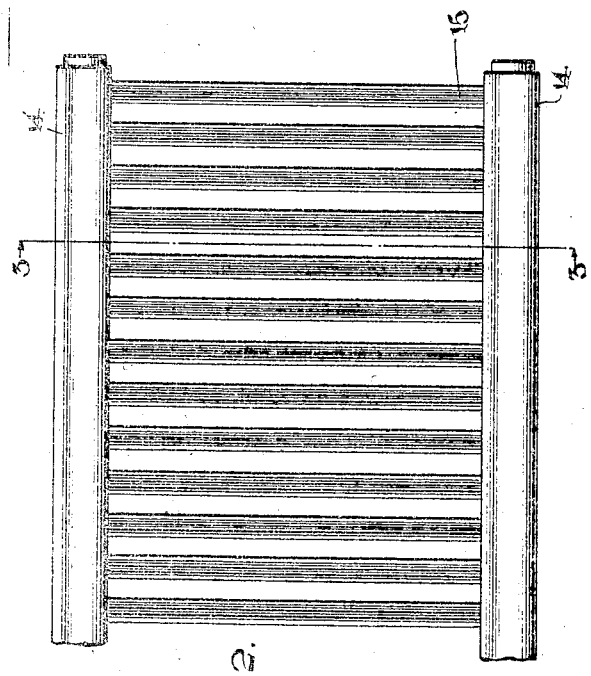
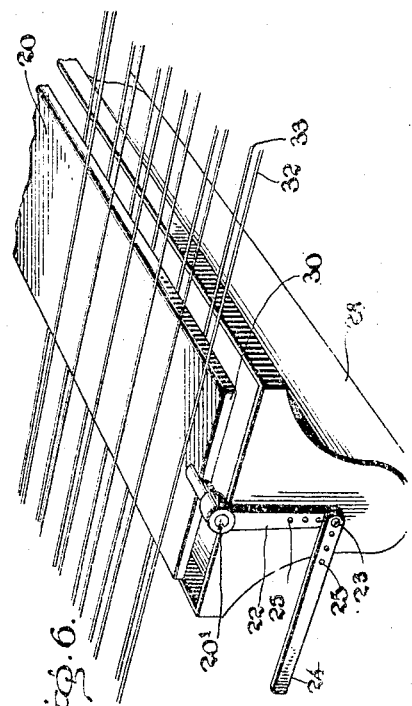
INVENTOR
Charles W. Young,
BY
ATTORNEY Patented May 5, 1925.

1,536,644

UNITED STATES PATENT OFFICE.

CHARLES W. YOUNG, OF GOODYEAR, CONNECTICUT, ASSIGNOR TO THE GOODYEAR TIRE & RUBBER COMPANY, OF AKRON, OHIO, A CORPORATION OF OHIO.

FABRIC-TREATING MACHINE.

Application filed October 21, 1924. Serial No. 744,887.

*To all whom it may concern:*

Be it known that I, CHARLES W. YOUNG, a citizen of the United States, and resident of Goodyear, Connecticut, have invented new and useful Improvements in a Fabric-Treating Machine, of which the following is a specification.

My present invention relates to fabric-treating machines, and has particular relation to a device for cutting filling from woven fabric used in the construction of automobile tires.

One object of my invention consists in providing a fabric-treating machine adapted to feed a strip of fabric of any desired width from a reweaving roll, through a novel cutting mechanism which severs the cross woven threads, and thence into a loom to be rewoven.

A second object of my invention consists in providing a machine for cutting the cross threads of cord fabric, and in providing a beater member for shaking out the short sections of cut threads before the fabric is rewoven.

Other objects and advantages will be apparent, to those skilled in the art, as the description of the device proceeds.

Heretofore, when a roll of cord fabric as used in the manufacture of cord tires was found to be defective, for example, when it had a number of cross-threads broken, the fabric was unfit for the manufacture of tires, and therefore it was sold as scrap. My invention aims to provide a machine which will make this fabric useful by removing the defective threads and reweaving it at very low cost and in a minimum of time so as to render it suitable for the manufacturing of tires.

For a better understanding of my invention and in order to have a detailed description thereof, reference may be now had to the accompanying drawings which form a part of this specification and in which:

Fig. 1 is a perspective view of a machine embodying my invention;

Fig. 2 is a fragmentary view illustrating the method of mounting cutter blades;

Fig. 3 is a cross-sectional view of a single cutter-blade, taken on line 3—3 of Fig. 2;

Fig. 4 is an enlarged cross-sectional view of a cutter-blade taken substantially on the line 4—4 of Fig. 3;

Fig. 5 is a cross-sectional view of a cutter-blade representing a modification of the structure illustrated in Fig. 4;

Fig. 6 is a perspective view of a beater forming a part of my invention;

Fig. 7 is a fragmentary perspective view showing the method of mounting of the cutter member; and Fig. 8 is a fragmentary perspective view of a beating mechanism representing a modification of the structure illustrated in Fig. 6.

In practicing my invention, I provide a frame member having longitudinally extending side members 1 which are supported upon any suitable base by means of supporting members 2. At one end of the frame member, I have provided a supporting member 3 upon which a reweaving roll 4 is mounted or journaled, as shown at 5. Adjacent the roll 4 is a tension roll 6 rotatably mounted in suitable bearings 6' upon upright supporting members 7. Between the two rolls 4 and 6 are usually placed three tension rolls, but, as these are of the conventional type, they are omitted from the drawing for the sake of clearness. A third roll 8, of relatively small diameter is mounted on the side members 1 in journal bearings 9. Adjacent the roll 8 a frame member 10 carrying a plurality of vertically disposed knives is mounted upon the side members 1, the member 10 being vertically adjustable by means of bolts 11 which pass through holes 12 provided in the side members 1. The member 10 is also capable of adjustment by tilting the same either forward or backward, and may be secured in those positions by passing the lower bolt 11 through openings 13 disposed on either side of the vertical row of openings 12, as best shown in Fig. 7. If desired, the adjustable features may be omitted and the rods 14 may be secured to the frame members 1 in any suitable manner. The frame member 10 is composed of two spaced rods 14 extending across the machine and cutter blades 15 are mounted in spaced relation between the rods 14, as clearly shown in Fig. 2. With reference to Fig. 4, it will be seen that each of the knives or cutter blades 15 is provided with spaced cutter guards 16. I have shown a modification of the cutter structure in Fig. 5 in which cutter guards 16' are in contact with the cutter blade 15. As will be apparent from these Figures 4 and 5, the cord fabric is adapted to pass between the blades, the cords being separated and guided by the guards 16 and 16'.

Adjacent the cutter frame 10 is mounted an additional guide roll 17 of relatively small diameter over which the fabric passes. At the end of the frame member 1 are mounted two additional rolls 18 and 19 which are similar to roll 17 and which serve as guides for feeding or directing fabric into a loom indicated at 29. Between the rolls 17 and 19 I have provided a beater mechanism 20 which is mounted on a shaft 20' journalled in bearings 21, and is provided with a lever arm 22 rigidly mounted on the end of the shaft 20'. A rod 24 extending from the loom is provided with an opening 25 and is connected to the arm 22 by means of a pin 23 extending through the holes 25 in the rod 24 and through a hole in the arm 22. The rod 24 is secured at 26 to an oscillating member 27, constituting a portion of the loom, and connected thereto in such manner that the arm 22 will be oscillated when the loom and cutting machine are in operation. Adjacent to the beater 20 I have provided an air suction device 28, the purpose of which will be hereinafter more specifically described.

In the operation of my device, a roll of fabric to be rewoven is mounted upon the reweaving roll 4, and the mechanism adjusted. The fabric is then carried down under the tension roll 6, thence up over the roll 8, and thence through the cutter blades, the longitudinally extending cords of fabric passing between the spaced blades. As the fabric is moved toward the loom, designated at 29, the cross threads are severed by the cutter blades 15. The fabric is then carried over the roll 17 and alternate cords are passed above and below the paddle member 30 of the beater member 20, as clearly shown in Fig. 6. The cords 32 and 33 are passed alternately above and below the beater 20 so as to be more violently agitated as the lever 22 oscillates the beater member. The air suction device 28, which is arranged adjacent the beater 20, also serves to assist in removing the cut fillings by drawing them out and carrying them away. When the fabric passes over the roll 18, all the filling has been removed, and it passes into the loom 29 ready to be rewoven. The structure and operation of the loom does not require description, as the loom forms no part of the present invention.

As a modification of the beater mechanism 20, I have shown in Fig. 8, a skeleton frame 34 comprising laterally extending bars 35 and 36 between which the cords 32 and 33 pass and are agitated to remove the severed ends of cross woven cords.

Although the preferred embodiments of my invention have been herein illustrated and described, it will be understood that changes, additions and modifications not inconsistent with the claims hereto appended may be made without in any sense departing from the essence of my invention, which is defined only by the appended claims.

What I claim is:

1. A device for treating fabric, comprising mechanism for directing fabric from a reweaving roll into a loom, means for cutting transverse threads of the fabric, and a member for shaking out the cut threads.

2. A fabric-treating device comprising mechanism for directing fabric into a loom, a row of cutting members mounted upon a frame, means for directing strands of fabric between the cutting members, and oscillating means operating against the longitudinally extending strands of the fabric for removing the cut portions from the fabric.

3. A fabric-treating device for cutting the weft filling from fabric comprising a series of knives positioned so that the warp strands of fabric move between the same and the weft strands are brought into engagement therewith and a beater operating against the fabric for removing the cut weft filling.

4. A fabric-treating device for cutting filling from fabric comprising a row of blades, cutter guards arranged adjacent the blades and oscillating means in contact with the fabric for removing the cut filling.

5. In a fabric-treating machine, mechanism for directing fabric into a loom, a plurality of cutter members adapted to sever transversely extending threads of said fabric, guards arranged on either side of the cutter members, and a lever operated means for removing the severed threads from the fabric.

6. In a fabric-treating machine, mechanism for directing fabric into a loom, a plurality of cutter members adapted to sever transversely extending threads of fabric, guards arranged adjacent the cutter members, and adjustable lever operated means for removing the severed threads from the fabric.

7. In a fabric-treating machine, mechanism for directing fabric into a loom, a series of knives adapted to sever transverse threads of fabric, guards arranged adjacent said knives, said knives and guards being mounted upon an adjustable member and means for removing the severed threads.

8. In a fabric-treating machine, a series of rollers for guiding fabric into a loom, a series of knives arranged to sever the transverse threads of fabric, guards arranged adjacent the knives, and lever operated means for removing the severed threads from the fabric, said rollers being disposed on opposite sides of said knives and lever operated means.

9. In a fabric-treating machine, mechanism for guiding fabric into a loom including a roller, a series of vertically arranged knives for severing transverse threads of fabric, and lever operated means for removing the severed threads from the fabric.

10. An apparatus for cutting and removing transverse threads from cord fabric comprising a row of knives between which the fabric strands move, an adjustable member supporting said knives, and an oscillatable beater member, the fabric strands passing alternately above and below the beater member.

11. An apparatus for removing transverse threads from cord fabric comprising a plurality of blades mounted in a frame, means for passing cord fabric between said blades for severing the transverse threads, an oscillating member adapted to agitate the fabric to shake out the severed threads, and air pumping means disposed adjacent to said member to assist in removing cut threads by providing a current of air through the fabric.

12. In a fabric-treating apparatus, means for guiding cord fabric into a loom including tensioning rollers means for cutting transverse threads of fabric, oscillating means operating against the fabric, and an air pump associated with the apparatus and providing a current of air against the fabric to assist in removing cut threads therefrom.

13. In a fabric-treating apparatus, means for guiding cord fabric through the apparatus into a loom, including tensioning rollers, means for cutting transverse threads of the fabric, oscillating means operating between the cords of the fabric, and a suction air-pumping means disposed adjacent the oscillating means to assist in removing the cut threads.

14. In a fabric-treating apparatus, means for guiding cord fabric through the apparatus into a loom, including tensioning rollers, means for severing transverse threads of fabric, a beater including integral paddle members, the cords of the fabric passing alternately above and below said paddle members, a rigid arm extending from one end of the beater and provided with spaced holes, a rod connected in one of the holes and adapted to operate from a movable member of the loom, and suction air pumping means disposed adjacent said beater.

15. A fabric-treating machine comprising mechanism for feeding fabric from a reweaving roll into a loom, means for cutting transverse threads of the fabric, a member for shaking out the cut threads, and suction air-pumping means disposed adjacent said member.

In witness whereof, I have hereunto signed my name in the presence of two subscribing witnesses.

CHARLES W. YOUNG.

Witnesses:
   H. L. COULTER,
   I. A. McDANIEL.